United States Patent [19]
Koga et al.

[11] Patent Number: 5,183,308
[45] Date of Patent: Feb. 2, 1993

[54] FOOTREST APPARATUS

[75] Inventors: Yoshitaka Koga, Kariya; Sadao Sugiura, Anjyo, both of Japan

[73] Assignee: Aisin Seiki Kabushiki Kaisha, Kariya, Japan

[21] Appl. No.: 811,956

[22] Filed: Dec. 23, 1991

[30] Foreign Application Priority Data

Dec. 27, 1990 [JP] Japan .................................. 2-415171

[51] Int. Cl.⁵ .............................................. B60N 3/06
[52] U.S. Cl. ...................................... 296/75; 180/90.6
[58] Field of Search ........................... 296/75; 180/90.6

[56] References Cited

U.S. PATENT DOCUMENTS 2,032,157 2/1936 Van Dresser et al. .................. 296/75
3,059,960 10/1962 Komorowski et al. ................ 296/75

FOREIGN PATENT DOCUMENTS 60-87828 6/1985 Japan .
61-24424 7/1986 Japan .

Primary Examiner—Robert R. Song
Attorney, Agent, or Firm—Finnegan, Henderson, Farabow, Garrett & Dunner

[57] ABSTRACT

A footrest apparatus for supporting the calves of a passenger seated in the rear seat of an automobile includes a stationary plate secured to the floor of the vehicle, a link mechanism turnably provided on a forward end of the stationary plate, a footrest member turnably connected to a rearward end of the stationary plate and connected to one end of the link mechanism, a screw turned by a drive source via a reduction device, and a nut threadedly engaged with the screw. The link mechanism is turned by relative movement of the nut to move the footrest member up and down about the rearward end thereof.

4 Claims, 6 Drawing Sheets

FOOTREST APPARATUS

BACKGROUND OF THE INVENTION

1. Field of the Invention

This invention relates to a footrest apparatus for use in the back seat of an automotive vehicle.

2. Description of the Prior Art

A conventional example of a footrest apparatus of this kind has already been disclosed, for instance, in Japanese Utility Model Application Laid-Open (KOKAI) No. 60-87828. In this disclosed apparatus, a portion of the seat back of a front seat is reclined rearward to form a footrest for the passenger seated in the back seat. A problem encountered with this arrangement is that when the footrest is lowered from the seat back accommodating it, the feet of the passenger seated in the back seat become an obstruction and must be raised. Also, there is the danger that the feet of this passenger may be pinned under the footrest since the latter is lowered from above the feet. Another drawback in terms of practicality is that it is difficult to freely set the footrest at any desired position to conform to the physical build or attitude of the passenger.

An apparatus described in Japanese Utility Model Publication (KOKOKU) No. 61-24424 is so adapted that a footrest accommodated in the seat back of a front seat by a link mechanism is made to project toward the back seat. Though this apparatus is capable of being adjusted to set at either of two positions, there is still a problem that the positions of this projecting footrest are limited and it is difficult for this apparatus to hold the passenger's feet at a comfortable position.

Thus, in the two prior-art arrangements described above, both footrests are secured to the seat back of the front seat and therefore the positions of the footrests are influenced greatly by the position of the front seat. As a result, several comfortable positions for the passenger using the footrest cannot readily be assured.

SUMMARY OF THE INVENTION

Accordingly, an object of the present invention is to provide a footrest apparatus in which the positions of the footrest can be freely adjusted so that the passenger using it can readily assume a comfortable posture or attitude.

According to the present invention, the foregoing object is attained by providing a footrest apparatus for an automotive vehicle, which comprises footrest means and driving means, the footrest means including a stationary plate secured to a floor of the automotive vehicle, a link mechanism turnably provided on the stationary plate, and a footrest member turnably connected to the stationary plate and connected to one end of the link mechanism, and the driving means including a drive source, a screw turned by the drive source via a reduction device, and a nut threadedly engaged with the screw, wherein the link mechanism is turned by relative movement of the nut to move the footrest member up and down.

By virtue of the construction of the present invention as described above, the position of the footrest can be freely adjusted so that the passenger using the footrest may readily assume a comfortable posture.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENT

Figure 1:
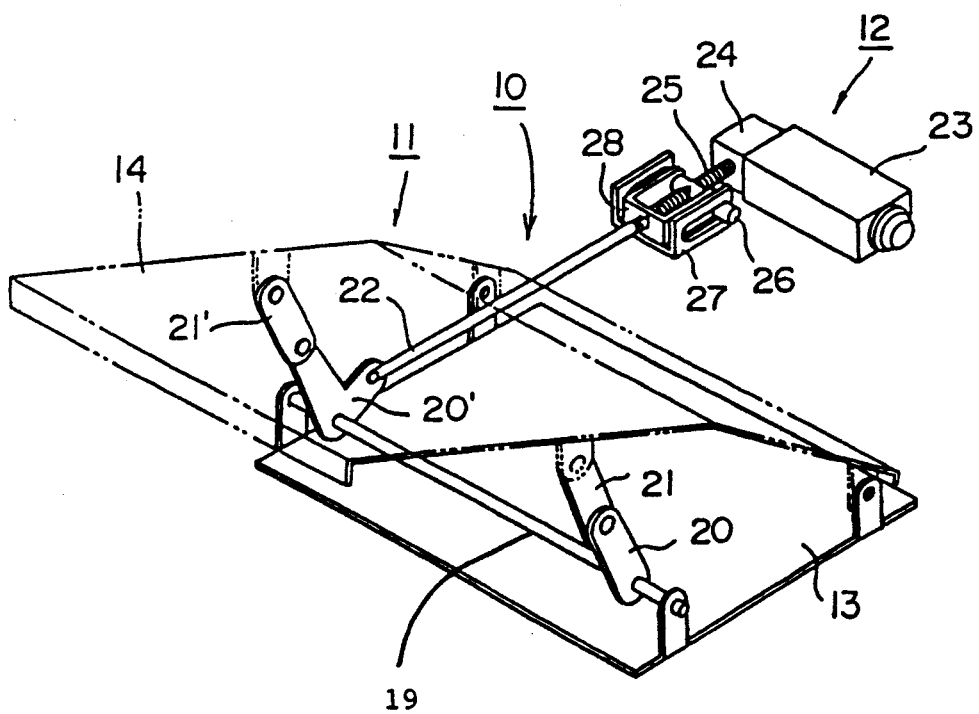
FIG. 1 is a perspective view showing an embodiment of a footrest apparatus according to the present invention.
Figure 2:
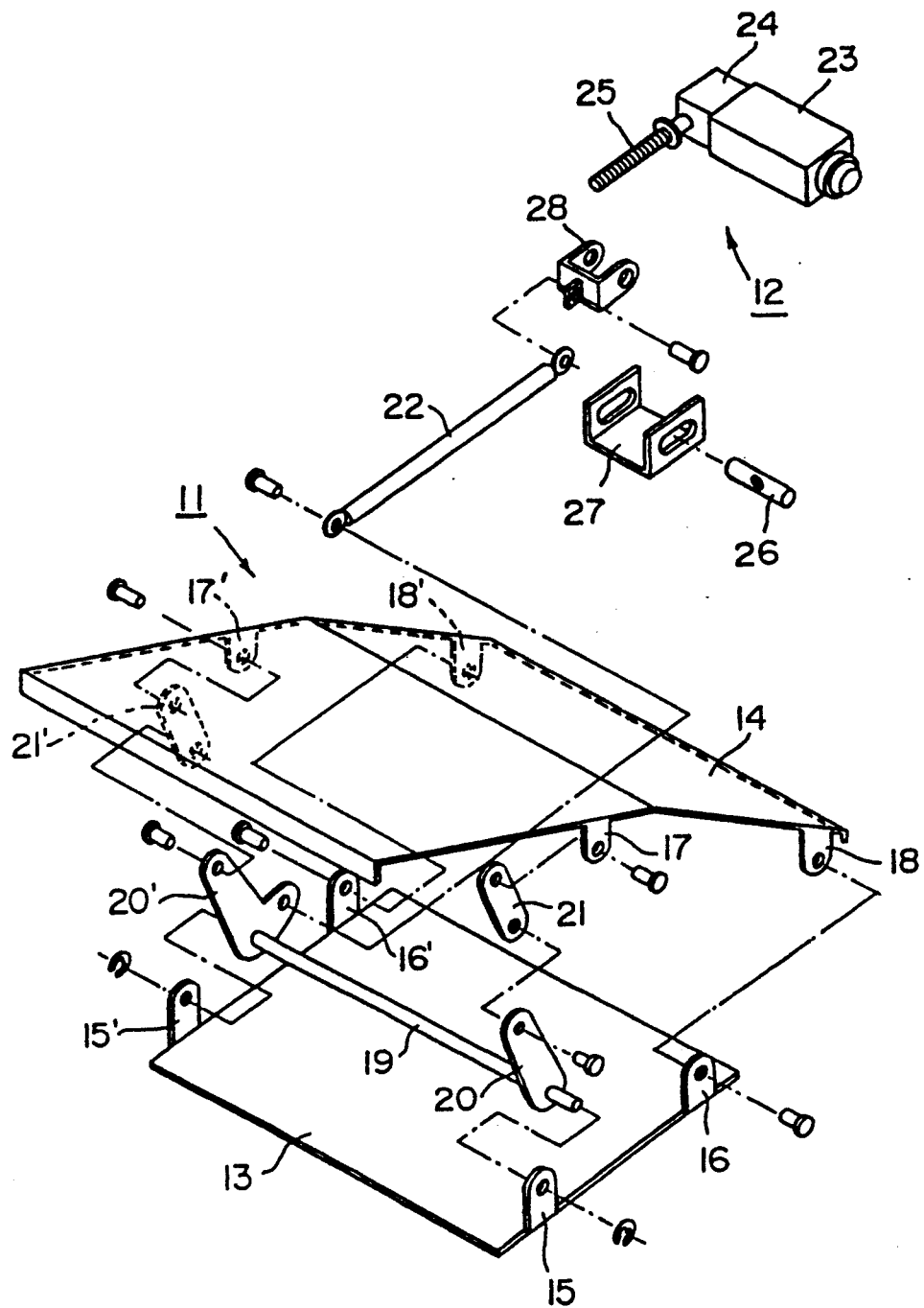
FIG. 2 is an exploded perspective view showing the footrest apparatus illustrated in FIG. 1.
Figure 3:
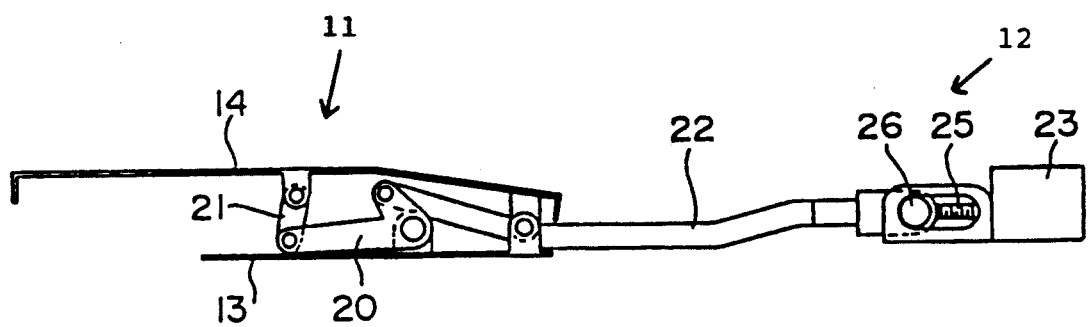
FIG. 3 is a side view showing the accommodated state of a footrest member in the footrest apparatus illustrated in FIG. 1.
Figure 4:
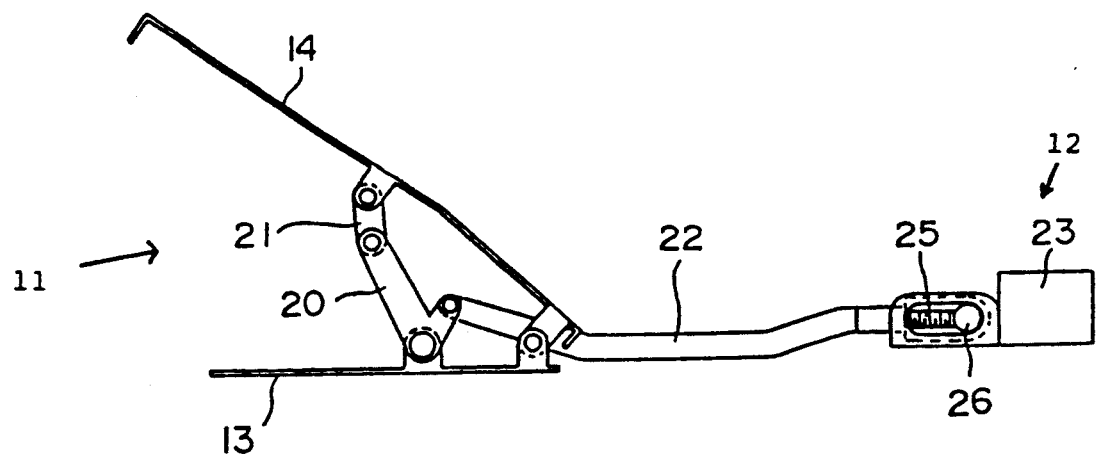
FIG. 4 is a side view showing the raised state of the footrest member in the footrest apparatus illustrated in FIG. 1.
Figure 5:
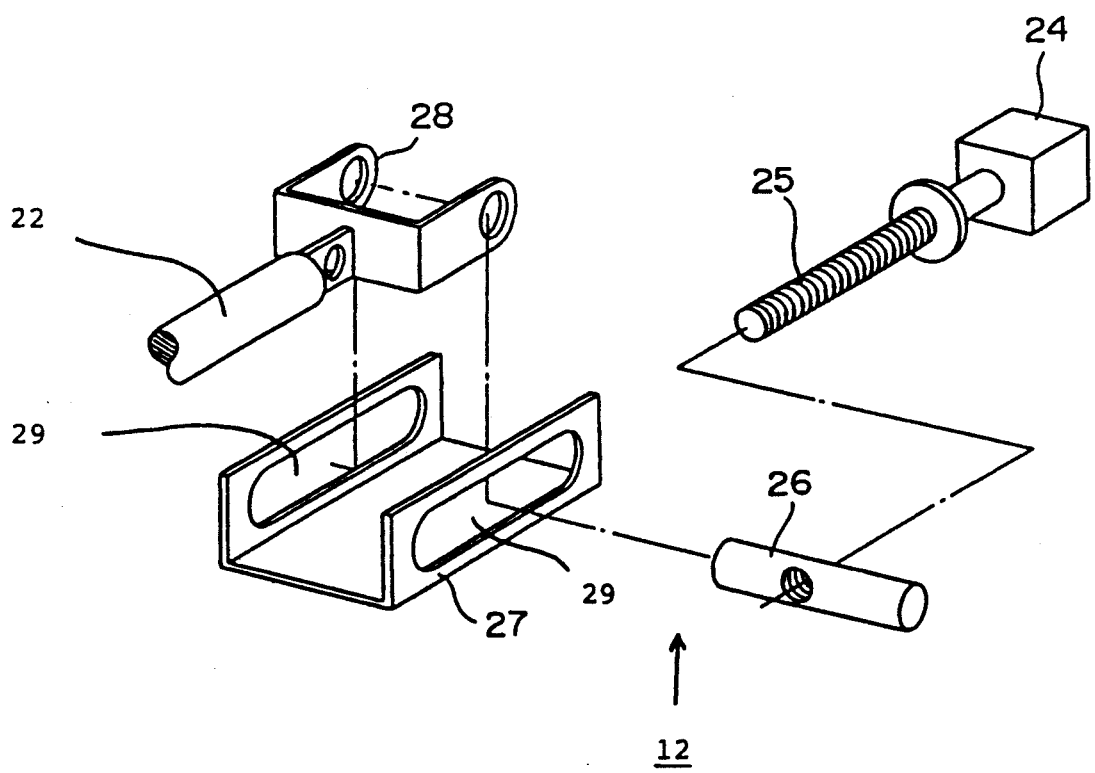
FIG. 5 is an enlarged exploded view showing the driving portion of the footrest apparatus illustrated in FIG. 1.
Figure 6:
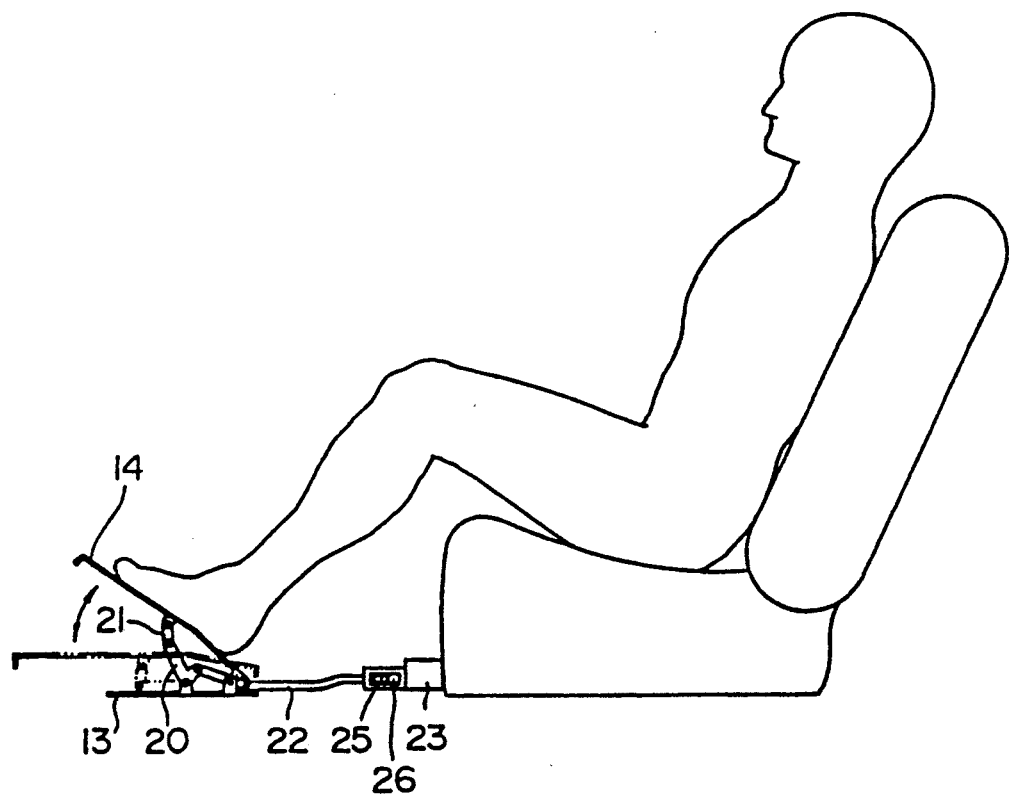
FIG. 6 is a diagram showing the footrest apparatus of FIG. 1 in the state in which it is used.

A preferred embodiment of the present invention will now be described in detail with reference to the accompanying drawings.

As illustrated in the drawings, a footrest apparatus 10 is divided into a footrest portion 11 and a motor-operated driving portion 12. The footrest portion 11 includes a link mechanism interposed between a stationary plate 13 secured to the floor of an automotive vehicle and a footrest member 14. The arrangement is such that the footrest member 14 is moved up and down by the link mechanism. The stationary plate 13 is formed to include fixing lugs 15, 15' and 16, 16', and the footrest member 14 is formed to include fixing lugs 17, 17' and 18, 18'. The fixing lugs 18, 18' of the footrest member 14 are rotatably connected to the fixing lugs 16, 16' of the stationary plate 13.

The link mechanism includes a rod 19, which is for transmitting rotational motion to both sides, rotatably secured to the fixing lugs 15, 15' of the stationary plate 13. Links 20, 20' are fixed to both ends of the rod 19, and distal ends of the links 20, 20' are connected to respective fixing lugs 17, 17' of the footrest member 14 via swingable links 21, 21', respectively. A connecting rod 22 is rotatably secured to one end of the link 20'. The footrest member 14 is moved up and down about the fixing lugs 16, 16' by changing back-and-forth motion of the connecting rod 22 to rotational motion of the link portion. In other words, the forward fixing lugs 17, 17' of the footrest member 14 are moved up and down about the fixing lugs 16, 16', according to the rotational movements of the links 20, 20', 21, 21'.

The driving portion 12 includes a motor 23, a reduction device 24, a screw 25 rotated by the driving force of the motor 23 via the reduction device 24, and a nut 26 secured to a guide bracket 27 having, elongated holes 29 and a nut fixing bracket 28 of a channel shaped member. The nut 26 is threadedly engaged with the screw 25. Accordingly, the nut 26 is moved back-and-forth relative to the screw 25 owing to rotation of the screw 25. This motion applies back-and-forth movement to the connecting rod 22, which is rotatably secured via the nut fixing bracket 28. Owing to this back-and-forth movement of which limitation is made by the elongated holes 29 on the bracket 27, the links 20, 20' and 21, 21' are caused to rotate so that the footrest member 14 is moved up and down with the fixing lugs 16, 16' serving as fulcrums.

In the embodiment described above, the driving portion 12 is arranged so as to protrude from the footrest portion 11. However, it is possible to adopt an arrangement in which the driving portion 12 is accommodated within the footrest portion 11. In a case where the driving portion 12 is accommodated in this manner, installation, serviceability and commercial value are enhanced.

Effects similar to those of the above-described embodiment can be obtained even if the driving portion 12 is disposed in the open side of the footrest member 14.

The footrest apparatus of the present invention has a number of practical advantages. First, the angle or position of the footrest member 14 can be freely adjusted so that the passenger using the footrest can readily assume a comfortable posture. Second, the entire apparatus is capable of being installed on the floor very simply via the stationary plate 13. This enhances ease of installation. Third, the structure is such that the footrest member 14 is placed in the elevated attitude by being raised from below. This assures safety since the legs of the passenger cannot be pinned under the footrest member. Fourth, since the footrest apparatus is secured to the floor, it is not affected by the position of the seat in front and can even be installed at the passenger seat alongside the driver. Fifth, since only the driving portion is placed at a separate location (at the foot of the rear seat, for example, as in the illustrated embodiment), the thickness of the footrest apparatus itself can be reduced. This is convenient in terms of making it easy to install the apparatus.

As many apparently widely different embodiments of the present invention can be made without departing from the spirit and scope thereof, it is to be understood that the invention is not limited to the specific embodiments thereof except as defined in the appended claims.

What is claimed is:

1. A footrest apparatus for an automotive vehicle and comprising footrest means and driving means;
   said footrest means including:
   a stationary plate secured to a floor of the automotive vehicle;
   a link mechanism pivotably supported on said stationary plate; and
   a footrest member pivotably connected to said stationary plate and to said link mechanism;
   said driving means including:
   a drive source including a reduction device;
   a screw turned by said drive source through the reduction device;
   a nut threadedly engaged with said screw; and
   an elongated rod connecting said nut and said link mechanism;
   wherein said link mechanism is operated by relative movement of said nut to move said footrest member up and down, and said driving means is located to be spaced from said footrest means.

2. A footrest apparatus for an automotive vehicle and comprising footrest means and driving means;
   said footrest means including:
   a stationary plate secured to a floor of the automotive vehicle and having front, rear and opposite side ends;
   a link mechanism including a rod rotably connected to the opposite side ends to be spaced from eh rear end of said stationary plate; and
   a footrest member rotatably connected near the rear end of said stationary plate and connected to one end of said link mechanism;
   said link mechanism further including links secured to said rod and rotatably connected to said footrest member;
   said driving means including:
   a drive source including a reduction device;
   a screw turned by said drive source through the reduction device;
   a nut threadedly engaged with said screw; and
   a connecting rod pivotally connected at opposite ends to one of said links and said-nut, respectively;
   wherein said link mechanism is operated by relative movement of said nut to move said footrest member up and down.

3. The apparatus to claim 2, comprising a stationary guide bracket having opposite side members defining elongated holes, and wherein said nut is moved back-and-forth along said elongated holes.

4. The apparatus according to claims 3, wherein a di nut is defined by an elongated member.

* * * * *

UNITED STATES PATENT AND TRADEMARK OFFICE
CERTIFICATE OF CORRECTION

PATENT NO.   : 5,183,308
DATED        : February 2, 1993
INVENTOR(S)  : Yoshitaka KOGA and Sadao SUGIURA It is certified that error appears in the above-identified patent and that said Letters Patent is hereby corrected as shown below:

Claim 2, column 4, line 21, "eh" should read --the--;

Claim 2, column 4, line 35, "said-nut" should read --said nut--.

Signed and Sealed this

Sixteenth Day of November, 1993

Attest:

BRUCE LEHMAN

Attesting Officer           Commissioner of Patents and Trademarks